Feb. 25, 1947.　　　R. F. MEHL　　　2,416,400
METHOD OF MAKING COMPOSITE METAL BODIES
Filed May 24, 1943
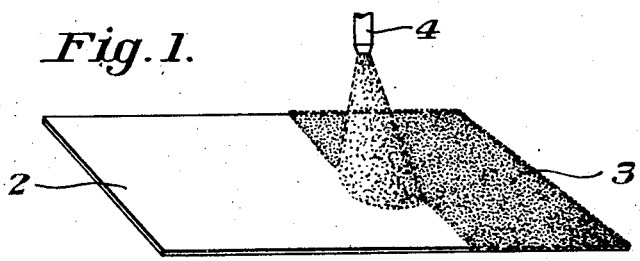
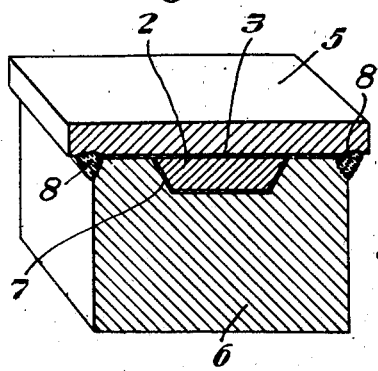
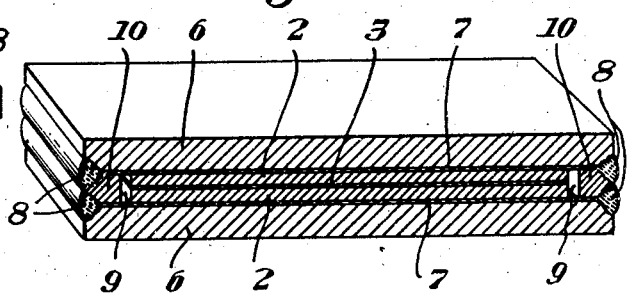
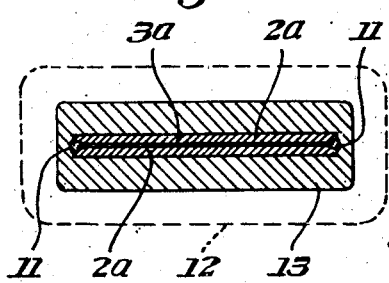
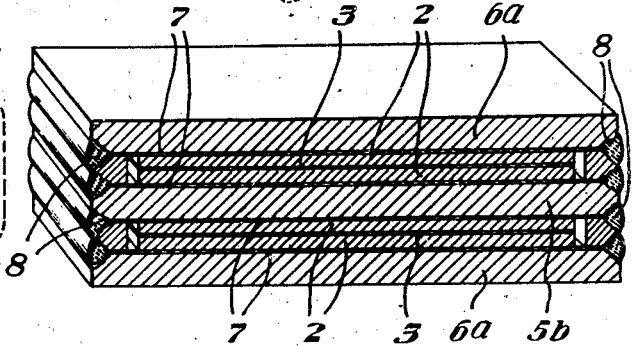
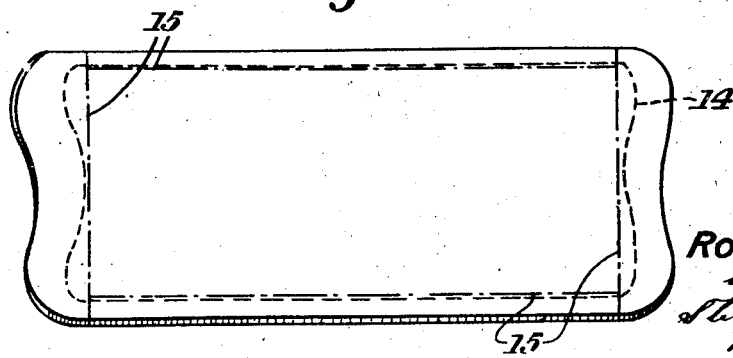
INVENTOR
Robert F. Mehl Patented Feb. 25, 1947

2,416,400

UNITED STATES PATENT OFFICE 2,416,400

METHOD OF MAKING COMPOSITE METAL BODIES

Robert F. Mehl, Pittsburgh, Pa., assignor to Jessop Steel Company, Washington, Pa., a corporation of Pennsylvania Application May 24, 1943, Serial No. 488,239

4 Claims. (Cl. 29—189)

This invention relates to a method of making composite metal bodies having two or more permanently united metallic components. Composite metal bodies, particularly plates, sheets, and strips, have many industrial applications. Various combinations of metals or of metallic alloys are employed, depending upon the use to which the body is to be put, but all of them are characterized by a permanent and continuous union of the components. In one method of making them, the components are assembled, heated and hot worked, for example, by hot rolling, so as to unite the components. In this method it is common practice to form an assembly consisting of, say, two backing plates and two interposed insert or cladding plates with a separating medium between the insert plates; to hot work the assembly; and to separate the composite metal bodies after hot working. The method is particularly desirable in the making of composite metal bodies consisting of a cladding of stainless steel and a lower-cost backing, usually low carbon steel. A separating medium is applied to adjoining faces of the inserts which are then covered with the backing plates. The periphery of the assembly is sealed by welding. The assembly is heated and rolled to the desired thickness, and the edges are then sheared. The two (or more) composite metal bodies are then separated along the plane or planes in which the separating medium has been interposed.

A variant of the process consists in placing the two stainless steel inserts face to face with a separating medium between them, welding around the periphery of the inserts, centering this assembly in an ingot mold, pouring into the mold the metal which is to form the backing, stripping the cast composite ingot, rolling this ingot to the desired thickness, shearing the edges off the rolled product, and separating the two composite metal bodies.

Grave defects in the processing as now commonly practiced arise because of shortcomings in the character of the available separating media. Many materials and compounds have been tried, of which perhaps the most successful is finely ground calcined aluminum oxide powder, mixed with lacquer and thinner as a vehicle, and painted on the surface of the inserts of the assembly.

Among the difficulties encountered with the usual separating media presently employed, there may be mentioned the following:

1. The separating medium sometimes shifts within the assemblies, thus forming pits in the surface of the insert material wherever the medium has accumulated and furthermore causing sticking of the bodies at points from which the medium has shifted.

2. The separating medium sometimes shifts within the assemblies and in doing so may get between the insert and the backing plate, thus preventing these components from bonding.

3. Because of the tendency of the medium to shift, it has generally been necessary to lay the assembly flat while heating, thus substantially reducing the heating furnace capacity.

4. In those cases where the separating medium is applied in paint-like form, it is necessary to dry it thoroughly before assembling; this condition slows up production.

In accordance with the present invention, these disadvantages are overcome. I form a separating medium by spraying molten metal on at least one of the adjacent surfaces of the metal bodies going to make up the assemblage, at the plane or planes of desired separation. This produces a separating film which possesses many advantages, among them the following:

1. The separating medium does not shift in the assembly and form pits in the surface of the insert. It prevents sticking because no areas of the inserts are left bare due to the shifting of the separating medium.

2. Since the sprayed metal used as a separating medium does not shift, the danger of its getting between the inserts and the backing plate is eliminated. This eliminates the necessity of laying assemblies horizontally in the heating furnace.

3. The separating medium spreads uniformly with the inserts during the hot forming operation.

4. The sprayed metal solidifies as it is sprayed on to the metal body and this eliminates the time lapse normally required to allow the applied medium to dry evenly, thus speeding production.

In the accompanying drawings, diagrammatically illustrating my invention,

Fig. 1 is a perspective view showing the spraying of an insert, one of the components of the composite metal bodies;

Fig. 2 is a view partly in section showing a three-ply assembly. In this figure, as in other of the figures of the drawings, several elements of the assembly are shown disproportionately thick for clarity of illustration;

Fig. 3 is a view partly in section showing a four-ply assembly;

Fig. 4 is a view partly in section showing a seven-ply assembly;

Fig. 5 shows a modified method of making assemblies by the casting of the backing material; and Fig. 6 is a schematic illustration of the shearing of the as-rolled composite plates, sheets, or strips, prior to the operation of separating the permanently and continuously united composite metal bodies.

Fig. 1 shows an insert 2, in the process of having one surface coated with a layer 3 of sprayed metal. The entire surface is to be sprayed. The hot metal spray gun is diagrammatically indicated at 4. Guns of this sort are well-known and require no detailed explanation here. They serve to project molten metal in the form of a fine mist or spray which adheres to the metal surface onto which it is projected. The minute particles apparently become coated with a thin film of oxide during the spraying process. By manipulating the flame and by changing the distance from the gun to the insert being sprayed, the degree of oxidation of the sprayed material can be controlled to some extent. Various metals may be used in the sprayed form as the separating agent in the production of composite metal bodies by the method described. I prefer to use zinc, but other metals such as aluminum or magnesium, or a combination of two or more metals, may be used.

A three-ply assembly is shown in Fig. 2. This type of assembly is particularly advantageous for the manufacture of composite tool steels. The assembly consists of a backing plate 6, an insert 2 and a cover plate 5. In this instance, the separating layer 3 is sprayed onto the cover plate 5. It has been found that in this type of assembly, it is not particularly advantageous or feasible to spray the adjacent face made up in part by the backing plate and in part by the insert.

In order to insure the bonding of the insert and the backing plate, a thin layer 7 of iron is preliminarily electro-plated on the back surfaces of the insert. This insures the welding of the insert to the backing plate during the hot working. The use of this iron-plating is advantageous when stainless steel inserts are used but it is optional and need not be used with some insert material such as nickel or silver.

The cover plate 5 is somewhat wider than the backing plate 6 and the overlap serves as a groove in which a weld 8 is made entirely around the periphery of the joint in order to seal the assembly.

A four-ply assembly is shown in Fig. 3. Assemblies of four plies and of seven plies are used where the desired final product is flat. Assemblies of this sort are particularly applicable to the cladding of a low carbon base metal with a steel of the stainless type. The assembly consists of two backing plates 6 and two inserts 2, the backing plates being outermost. The sprayed metal separating layer 3 lies between the two inserts 2. It is applied to one or both of the inserts. As in the case of the three-ply assembly of Fig. 2, a thin layer 7 of iron is preliminarily electro-deposited on the backs of the inserts to insure the bonding of the inserts with the backing plates.

It will be noted from Fig. 3 that the backing plates are wider than the inserts and thus extend beyond the edges of the inserts. This provides a marginal recess 9 into which a filler strip 10 is fitted. A gap is left, as shown in Fig. 3, to take care of differential expansion of the components during heating. The assembly is sealed around its periphery by welds 8. This welding is usually done by the automatic carbon arc process.

Fig. 4 illustrates a seven-ply assembly. It consists of two outer backing plates 6a, a centrally located base plate 5b, and four inserts 2. As in the case of the four-ply assemblies, the separating medium 3 is sprayed on adjoining faces of the inserts, and iron 7 is electroplated on the faces of the inserts adjoining the backing plates. When this assembly is hot rolled and the edges are sheared, as later described, it results in two bi-metallic bodies, and a tri-metallic body having the insert material bonded to both faces of the base plate 5b.

Fig. 5 illustrates a modification in the method of making assemblies. In the procedure there illustrated, the two inserts 2a with a separating layer 3a of sprayed molten metal, are united around their periphery by a continuous weld 11. The assembly is then centered in an ingot mold, indicated by dotted lines at 12. Molten metal, which forms the base metal (backing) component of the composite metallic body, is poured into the mold around the welded insert assembly. The base metal solidifies into a sheath 13, thus forming a cast ingot assembly which may be handled during heating, hot working and finishing in the same manner as any of the assemblies described previously.

After the assemblies have been made, they are placed in a furnace and are heated to rolling temperature. Since there is no danger of a shifting of the separating medium, they may be placed on edge in the furnace, thus materially increasing the tonnage that may be heated in a given furnace. After heating, the assemblies are rolled to the desired thickness. In the rolling operation, the assemblies are thinned and elongated, and if cross-rolled, may be widened as well. When my separating medium is used, the assemblies can be reheated as often as necessary.

Fig. 6 illustrates the shearing of the as-rolled assembly. The dotted lines 14 indicate the outline of the insert and the dot and dash lines 15 indicate the preliminary shearing. When this shearing is completed, the composite metal bodies are separated, annealed, flattened, pickled, and cut to the pattern size; in the case of light gauge material, the annealing is usually completed before the preliminary shearing in order to prevent the sheets from buckling during heat treatment.

I have illustrated and described present preferred embodiments of the invention, but it will be understood that these are by way of illustration only, and that the invention may be otherwise embodied or practiced within the scope of the following claims.

I claim:

1. The method of making permanently united multi-component metallic bodies, which comprises providing the several components for the body and a protective metallic cover adapted to be assembled with the components and with one of its surfaces overlying a surface of one of the components, so as to protect the same during the uniting of the components and to be subsequently stripped from the united multi-component body, forming a separating medium to lie between said surfaces by spraying at least one molten metal of the group consisting of zinc, aluminum and magnesium over at least one of said surfaces, assembling the components and the cover with the sprayed metal interposed, heating the assemblage and uniting the components, and thereafter stripping the cover from the united multi-component body at the zone of the sprayed metal.

2. The method according to claim 1, characterized in that the component whose surface is sprayed with molten metal is a ferrous component.

3. The method according to claim 1 characterized in that the component whose surface is sprayed with molten metal is a non-ferrous component.

4. The method of making permanently united multi-component metallic bodies, which comprises spraying a surface of one component with at least one molten metal of the group consisting of zinc, aluminum and magnesium, providing the sprayed surface of said component and the opposite surface of said component with a protective metallic cover, heating and hot working the component and its cover to unite them at said opposite surface, removing the margins, and thereafter stripping the cover from the united multi-component body at the zone of the sprayed metal.

ROBERT F. MEHL.

REFERENCES CITED

The following references are of record in the file of this patent:

UNITED STATES PATENTS

| Number | Name | Date |
|---|---|---|
| 1,886,615 | Johnson | Nov. 8, 1932 |
| 1,950,871 | Trembour | Mar. 13, 1934 |
| 2,059,584 | Johnson | Nov. 3, 1936 |
| 2,159,043 | Orr, Jr. | May 23, 1939 |
| 2,161,116 | White | June 6, 1939 |
| 2,303,869 | Quinlan et al. | Dec. 1, 1942 |
| 2,320,329 | Meduna | May 25, 1943 |
| 1,128,058 | Schoop | Feb. 9, 1915 |

FOREIGN PATENTS

| Number | Country | Date |
|---|---|---|
| 410,300 | Great Britain | May 17, 1934 |